US012600099B2

(12) United States Patent　　(10) Patent No.:　US 12,600,099 B2
Serio et al.　　(45) Date of Patent:　　Apr. 14, 2026

(54) METHOD AND DEVICE FOR JOINING COMPOSITE MATERIAL ELEMENTS

(71) Applicant: LEONARDO S.P.A., Rome (IT)

(72) Inventors: Alessandro Serio, Da Monteiasi a Grottaglie (IT); Nicola Gallo, Da Monteiasi a Grottaglie (IT); Stefano Giuseppe Corvaglia, Da Monteiasi a Grottaglie (IT)

(73) Assignee: LEONARDO S.P.A. (IT)

( * ) Notice: Subject to any disclaimer, the term of this patent is extended or adjusted under 35 U.S.C. 154(b) by 86 days.

(21) Appl. No.: 18/701,485

(22) PCT Filed: Oct. 13, 2022

(86) PCT No.: PCT/IB2022/059825
§ 371 (c)(1),
(2) Date: Apr. 15, 2024

(87) PCT Pub. No.: WO2023/062580
PCT Pub. Date: Apr. 20, 2023

(65) Prior Publication Data
US 2025/0229499 A1　　Jul. 17, 2025

(30) Foreign Application Priority Data

Oct. 15, 2021　　(IT) ........................ 102021000026504

(51) Int. Cl.
*B29C 73/12*　　(2006.01)
*B29L 31/30*　　(2006.01)
(52) U.S. Cl.
CPC ....... *B29C 73/12* (2013.01); *B29L 2031/3076* (2013.01)
(58) Field of Classification Search
CPC ........ B29C 66/00145; B29C 66/81455; B29C 66/82661; B29C 66/1122; B29C 66/532;
(Continued)

(56) References Cited

U.S. PATENT DOCUMENTS 7,422,714 B1 * 9/2008 Hood .................... B29C 53/824
264/219
2012/0080135 A1 * 4/2012 Evens ................. B32B 37/0046
156/382
2012/0125534 A1 5/2012 Watson et al.

FOREIGN PATENT DOCUMENTS

EP 2457718 A2 5/2012
JP H04364929 A * 12/1992
JP 2014091271 A * 5/2014

OTHER PUBLICATIONS

International Search Report issued in PCT/IB2022/059825.
Written Opinion issued in PCT/IB2022/059825.

* cited by examiner

*Primary Examiner* — John L Goff, II
(74) *Attorney, Agent, or Firm* — The Belles Group, P.C.

(57) ABSTRACT

A method of joining a first element in composite material with a second element in composite material to define a structural component of an aircraft comprising
arranging the first element in contact on the second element;
applying a non-rigid heating layer on the first element;
applying a layer of shape memory thermoplastic polymer, pre-loaded in a compressed non-equilibrium condition, onto the heating layer;
applying a vacuum bag to the assembly thus obtained;
sealing the vacuum bag to define a vacuum chamber housing the first element, at least part of the second element, the heating layer and the shape memory layer;
applying vacuum inside the vacuum chamber;
applying heat to the first element, to the second element and to the shape memory layer by activating the heating layer;

(Continued)

expanding the shape memory layer from the compressed non-equilibrium condition to an expanded equilibrium condition by means of the step of applying heat.

14 Claims, 6 Drawing Sheets

(58) Field of Classification Search
CPC ............ B29C 66/5326; B29C 66/7212; B29C
66/73751; B29C 66/73753; B29C
66/7392; B29C 66/7394; B29C 66/81241;
B29C 70/544; B29C 73/32; B29C 73/10;
B29C 73/30; B29C 73/34; B29C 73/12;
B29C 65/5057; B29C 65/18; B32B 37/10;
B32B 37/1018; B32B 43/00; B29L
2031/3076; B29L 2031/3082
USPC ..................................... 156/285, 286, 94, 98
See application file for complete search history.

METHOD AND DEVICE FOR JOINING COMPOSITE MATERIAL ELEMENTS

CROSS-REFERENCE TO RELATED APPLICATIONS

This Non-Provisional Patent Application is a U.S. national stage application under 35 U.S.C. § 371 of PCT Application No. PCT/IB2022/059825, filed Oct. 13, 2022, which claims priority to Italian Patent Application No. 102021000026504 filed on Oct. 15, 2021, the entire disclosures of all of which are incorporated herein by reference, for all purposes.

TECHNICAL FIELD

The present invention relates to a method of joining a first element in composite material with a second element in composite material to define a structural component in composite material, for example a structural component used in the aeronautical field and being part of the structure of an aircraft, such as a beam, a stringer, a longeron or the like of the fuselage of an aircraft, to which the following description will explicitly refer without thereby losing generality.

In particular, the present invention is advantageously but not limitedly applied to the repair of a damaged or defective structural component in composite material.

Furthermore, the present invention is advantageously but not limitedly applied to the cure of the composite material constituting the structural component of the aforementioned type.

The present invention also relates to a joining device for joining a first element in composite material with a second element in composite material to define the aforementioned structural component in composite material, or a part thereof.

STATE OF THE ART

Structural components used in the aviation field are known, for example fuselages and parts thereof, manufactured in composite material. The use of such material is dictated by the need to reduce the overall weight of the aircrafts and to eliminate or minimize the problems of corrosion of the aeronautical structures and to increase the fatigue strength thereof.

In the state of the art, there are aeronautical structural components which are produced in light alloy and, therefore, in metal material, which then have to be applied to the fuselage.

The use of such metal elements and the mounting thereof in contact with the structures in composite material cause problems of galvanic coupling with related risks of corrosion of the metal and need to increase the inspection levels. This entails an increase in the total costs for the producers of such components and, therefore, for the air companies.

Therefore, there is the need to manufacture also such structural components in composite material.

The use of the composite material allows reducing the overall weight of the aircrafts and simultaneously obtaining very resistant structures.

In order to produce the aforementioned structural components, a plurality of layers of non-cured composite material is arranged on a suitably shaped forming tool, depending on the shape which is intended to be given to the structural component.

The composite material is a material composed of two steps: the matrix and the fiber. In particular, in the case of pre-impregnated materials, each layer is normally constituted by a matrix (in thermosetting resin, thermoplastic, etc.) reinforced by fibers of different nature such as carbon fibers, aramid fibers, glass fibers, etc.

The layers thus obtained are laminated together on the forming tool.

Subsequent to the lamination, if necessary, a forming process is carried out on a forming die usually with the aid of vacuum: in such manner, the layers are compacted and the desired shape (for example a T-, Z-, C-, omega profile, etc.) is impressed on the structural component.

The assembly thus formed is subsequently subjected to a cure process on a cure tool by applying high pressure and temperature, so as to cure the composite material and compact the aforementioned layers together and thus obtain the structural component.

To such end, the assembly is housed inside an autoclave inside which pressure and temperature are applied necessary for producing the polymerization of the resin and, therefore, the cure of the material.

However, the commonly used autoclaves have a much greater dimension with respect to the part. This entails an increase in the time and costs necessary for pressurizing and heating the autoclave, especially in the case where the component to be cured is of small dimensions with respect to the volume of the autoclave. Furthermore, autoclaves are considerably expensive.

The need is known in the sector to repair damaged or defective structural components. The repair of structural components reduces the wastes and allows reducing costs, especially in the case of manufacturing components of large dimensions.

Therefore, repair interventions are known which consist in applying a patch of non-cured or pre-cured pre-impregnated composite material on the defective or damaged part, preferably interposing an adhesive sheet between these. EP-A-2457718 provides examples of methods and apparatuses for manufacturing glued aircraft joints, i.e. manufactured with adhesive elements.

Around the damaged or defective component and the patch arranged on the part to be repaired, a vacuum bag is wound for applying a given pressure.

In alternative to the vacuum bag, some known solutions provide for the arrangement of an inflatable chamber above the patch and the application of the pressure by pressurizing the chamber, for example with compressed air.

A certain temperature is then applied, for example by means of infrared lamps.

In such manner, a joining is obtained between a first element (the patch) with a second element (the component) in composite material.

The Applicant observed that the pressure exerted by the vacuum bag only or by the inflatable chamber only does not allow reaching an optimal joining effectiveness (and therefore a repair effectiveness) between the two parts. Therefore, the Applicant observed that the known joining methods are susceptible of further improvements, in particular with regard to the aforementioned joining (repair) effectiveness, the flexibility and the applicability of the method to parts having different dimensions (or directly on the aircraft), the total reduction in costs, the simplicity and the rapidity of execution and the portability.

OBJECT AND SUMMARY OF THE INVENTION

The object of the present invention is to provide a method and device of joining a first element in composite material with a second element in composite material, which have high reliability and limited cost, and allow overcoming at least some of the drawbacks specified above and connected to the methods and devices of joining of known type.

According to the invention, this object is achieved by a method and by a device as claimed in the appended independent claims.

BRIEF DESCRIPTION OF THE DRAWINGS

In order to better understand the present invention, some preferred non-limiting embodiments are described in the following, by way of mere example and with the aid of the accompanying drawings, wherein.

DETAILED DESCRIPTION

Figure 1:
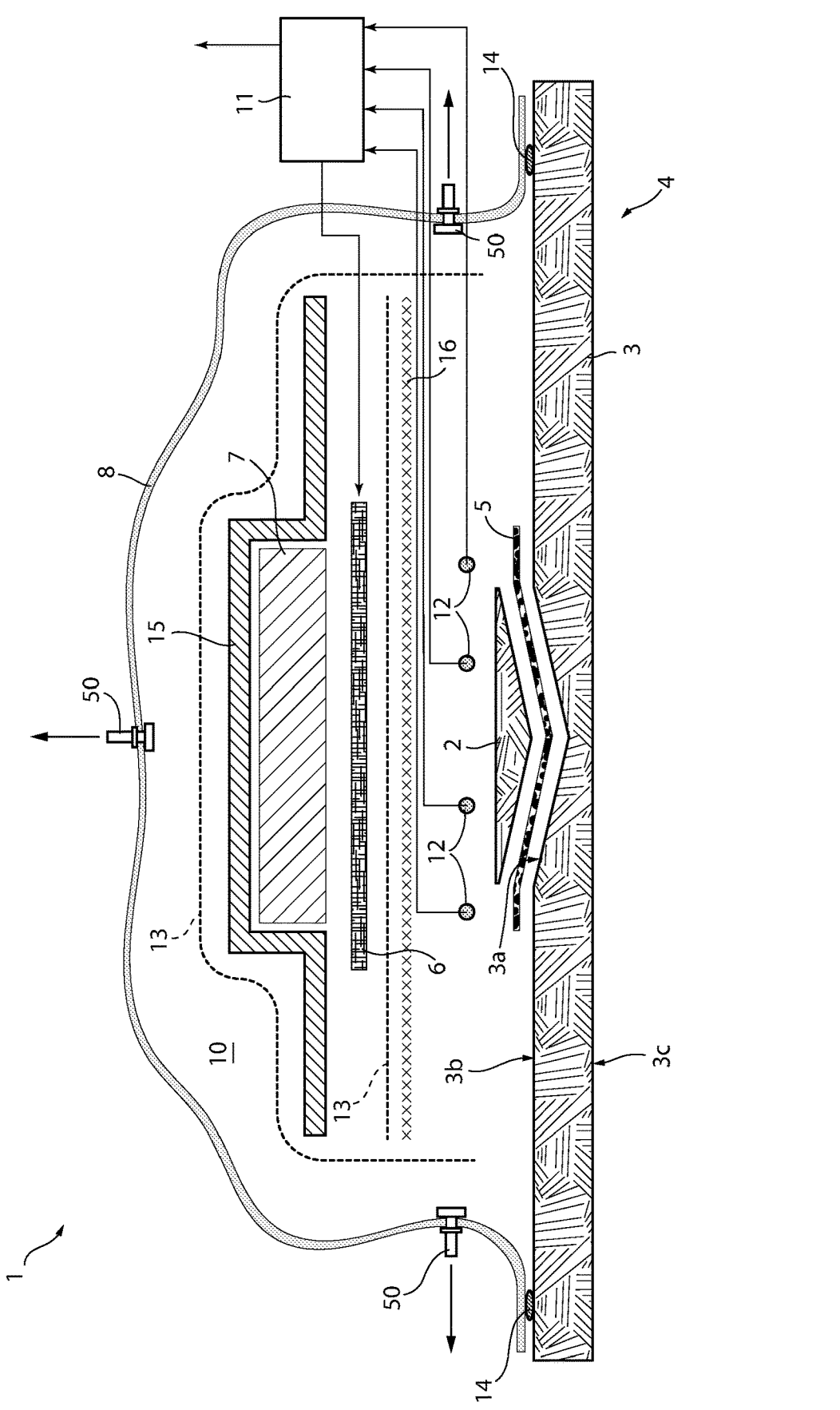
FIG. 1 is a schematic side view, with parts removed for clarity, of the device according to a first embodiment of the present invention, in an exploded configuration.

With reference to the accompanying drawings, reference numeral 1 indicates, as a whole, a device for joining a first element 2 in composite material with a second element 3 in composite material to define a structural component 4 used in the aeronautical field and being part of the structure of an aircraft, such as a beam, a stringer, a longeron or the like of the fuselage of an aircraft, to which the following description will explicitly refer without thereby losing generality.

In particular, the present invention is advantageously but not limitedly applied to the repair of the structural component 4.

Accordingly, according to a first embodiment of the present invention, the device 1 defines a repair device configured to joint (or unite or join) a repair patch in non-cured or pre-cured pre-impregnated composite material, defined by the first element 2, with a part of the component 4, defined by the second element 3.

For example, the second element 3 could be a panel forming the fuselage of the aircraft, a stringer, a beam, a longeron, a panel forming the wing, a part thereof, or the like.

In particular, the second element 3 comprises, at a surface 3b thereof, a damaged or defective or cracked portion 3a, which needs to be repaired. The patch 2 is conformed so as to assume a shape complementary to the shape of the portion 3a.

In use, the second element 3 is placed on a rest surface (not illustrated). In the case of repair carried out directly on the aircraft, for example a part of a panel constituting a wing, or the fuselage or other, the rest surface is defined by the second element 3.

Then, the first element 2, i.e. the repair patch 2, is arranged in contact on the second element 3, in particular inserted inside the portion 3a, preferably with the interposition of an adhesive layer 5.

According to an aspect of the present invention, the device 1 comprises a non-rigid heating layer, preferably an electric blanket 6.

The electric blanket 6 is configured to be applied on the patch 2 when it is arranged in use in contact onto the second element 3, i.e. inserted inside the portion 3a.

Figure 4:
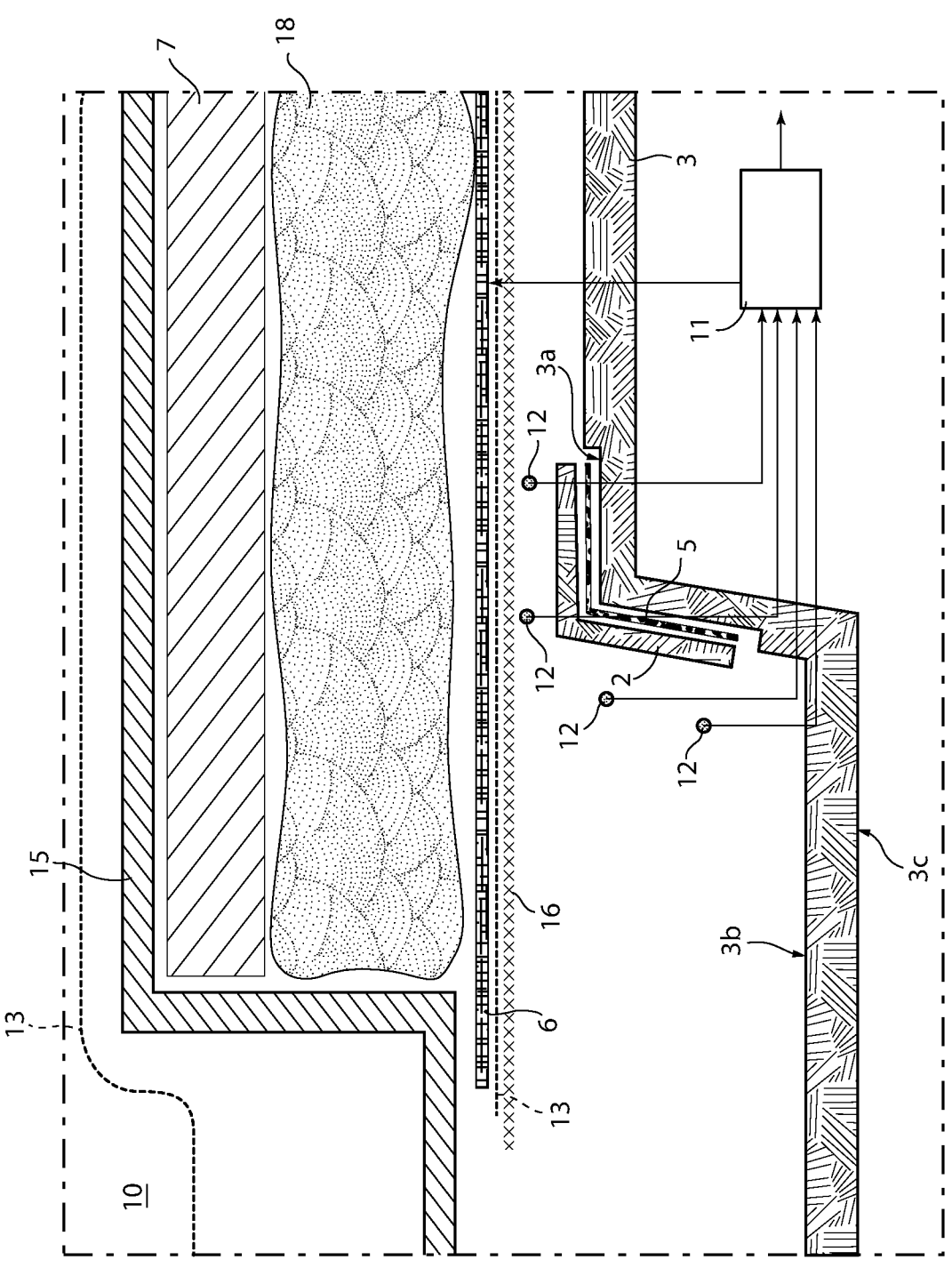
FIGS. 4 and 5 schematically illustrate, on an enlarged scale and with parts removed for clarity, the device manufactured according to a further embodiment of the present invention, in an exploded configuration and in an operation configuration, respectively.
Figure 5:
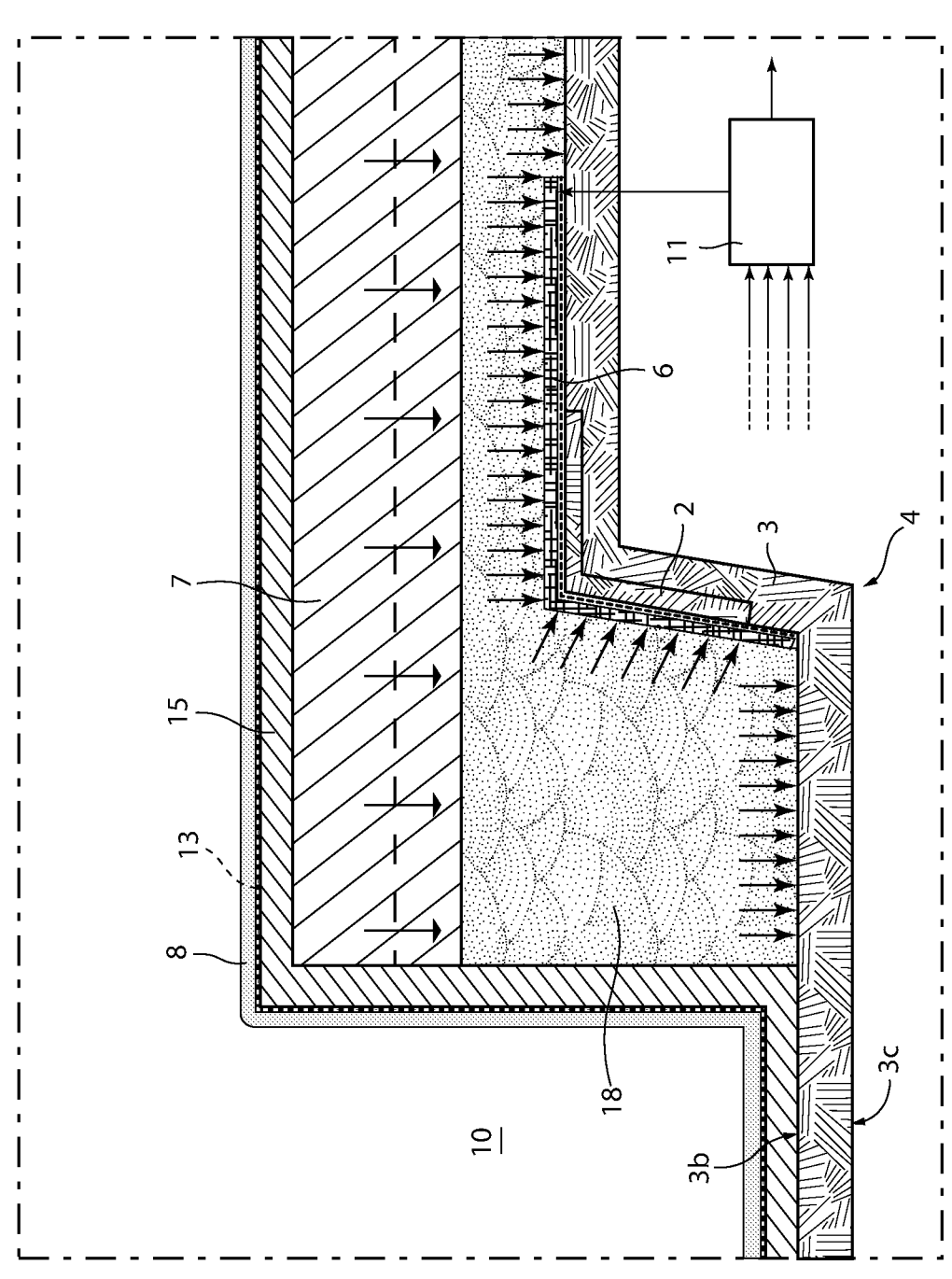

According to a further aspect of the present invention, the device 1 comprises a layer of shape memory thermoplastic polymer 7 controllable between a compressed non-equilibrium condition (visible in FIGS. 1, 2, 3, 4 and 6) and an expanded equilibrium condition (visible for example in FIG. 5).

Preferably, the shape memory layer 7 is made in a foamy polymeric material, for example PET.

As it is known, the shape memory polymeric materials of the type constituting the layer 7 are capable of fixing in a compressed non-equilibrium condition (or conformation) by means of a thermomechanical cycle which consists in heating, load application and final cooling under constraints. This deformed condition is "frozen" and subsequently recovered by means of further heating, which causes the expansion of the material to an expanded equilibrium condition (or conformation). If the recovery is carried out under constraints, loads are applied thereon due to the pressure generated by the expansion.

Polymeric foams, for example in PET, are capable of maximizing the shape memory properties thanks to the interaction between the macromolecular nature of the polymer and the cell microstructure. Therefore, high loads can be exerted by compressed foams during the recovery of the equilibrium condition.

The shape memory layer 7 is configured to be arranged on the electric blanket 6 pre-loaded in the compressed condition and to be expanded through the supplying of heat by activating the electric blanket 6.

The device 1 further comprises a vacuum bag 8 configured to be applied to the assembly thus obtained for defining a vacuum chamber 10 housing the shape memory layer 7, the electric blanket 6, the patch 2 and at least part of the second element 3, in particular the surface 3b of the second element 3 having the portion 3a to be repaired.

In use, the vacuum bag 8 is sealed by applying sealing adhesive mastic 14 for bags. According to the described example, the vacuum bag 8 is sealed on the surface 3b of the second element 3, the surface 3b thus partially delimiting the vacuum chamber 10.

Suitable valves 50 allow the outflow of the air contained in the vacuum chamber 10, up to the total application of the vacuum inside therein.

Conveniently, the device 1 also comprises a control unit 11 operatively connectable to the electric blanket 6 for controlling the activation thereof.

According to the invention, the electric blanket 6 is activable by the control unit 11 for applying heat to the patch 2 and to the second element 3.

Still according to the invention, the shape memory layer 7 is configured to apply pressure to the patch 2 for compacting it against the second element 3 by passing from the compressed condition to the expanded condition. Such passage is caused, in use and as mentioned above, by the supply of heat by the electric blanket 6.

Thanks to such configuration, it is thus possible to carry out the repair of the second element 3, for defining the structural component 4, in a simple, rapid and cost-effective manner.

Furthermore, since suitable pressure and temperature values can be reached by means of the shape memory layer 7, the electric blanket 6 and the vacuum bag 8, the composite material of the first element 2, i.e. of the patch, is suitably compacted to the second element 3 and cured therein, therefore making unnecessary a separate cure process in autoclave obtaining comparable mechanical performances. This entails undoubted advantages from the point of view of the repair time and of the costs. Furthermore, such system allows carrying out a repair directly on the structure of the aircraft (fuselage, wings, rudders, etc. . . . ) without having to demount and then remount the damaged part. The alternative, in fact, would be, in such case, to put in autoclave the entire aircraft.

Therefore, the Applicant observed that such innovative configuration allows reaching an optimal joining effectiveness (and thus repair effectiveness) between the two parts, increasing the flexibility and the adaptability of the repair process, reducing the costs and improving the simplicity and the rapidity of execution.

Preferably, the device 1 includes at least one temperature sensor, in particular a plurality of thermocouples 12 available at the first element 2 (i.e. the patch 2) and/or the second element 3 and configured to measure the temperature reached therein subsequent to the activation of the electric blanket 6 and to send a temperature signal to the control unit 11.

Advantageously, the control unit 11 is configured to control the temperature of the electric blanket based on the temperature signal received from the thermocouples 12.

In such manner, the repair process is further improved, since it is possible to control with precision the operation temperature and, therefore, set such essential parameter in adaptive manner, without the aid of a dedicated autoclave.

This further increases the joining effectiveness between the parts involved, as well as the cure effectiveness (polymerization of the part in resin) of the material to be cured.

Conveniently, the device 1 comprises at least a layer of ventilating fabric 13 (also known as breather) interposed between the electric blanket 6 and the first element (patch) 2 and preferably made in polyester or glass fiber with a predetermined weft.

The layer of ventilating fabric 13 has the function of evacuating resin gases and vapors which are produced subsequent to the heating of the pre-impregnated composite material by the electric blanket 6.

Advantageously, the device 1 comprises a covering layer, or cover 15, arranged in contact on the shape memory layer 7 on the opposite side relative to the patch 2 and configured to limit and/or prevent the expansion of the layer 7 in a direction opposite to the patch (first element) 2.

Specifically, the cover 15 allows the expansion of the layer 7 towards the patch 2 (downwards in FIG. 1) and prevents the expansion of the layer 7 in opposite direction (upwards in FIG. 1).

In such manner, the movement of the shape memory layer 7 from the compressed condition to the expanded condition is directed towards the patch 2 and the entire load that originates therefrom is applied to the latter.

This concentrates or localizes the pressure and further improves the effectiveness of the procedure.

Preferably, the cover 15 is made in composite material.

In use, the cover 15 is kept in a fixed position by the vacuum bag 8 once the vacuum has been applied inside the chamber 10.

In such manner, it is possible to direct the thrust of the shape memory material in a simple and cost-effective manner.

Preferably, the device 1 comprises a further layer of ventilating fabric 13 interposed between the vacuum bag 8 and the shape memory layer 7, in particular between the vacuum bag 8 and the cover 15, when this is present (as is shown in FIG. 1).

This further improves the breathability of the vapors produced during the compaction/repair process.

Conveniently, the device 1 comprises a layer of release film 16 (or partition layer) interposed between the electric blanket 6 and the patch 2, in particular between the patch 2 and the layer of ventilating fabric 13 when the latter is present (as is shown in FIG. 1).

In such manner, the removal and release process of the device 1 from the repaired structural component 4 will be simple and will not affect the repair.

Figure 2:
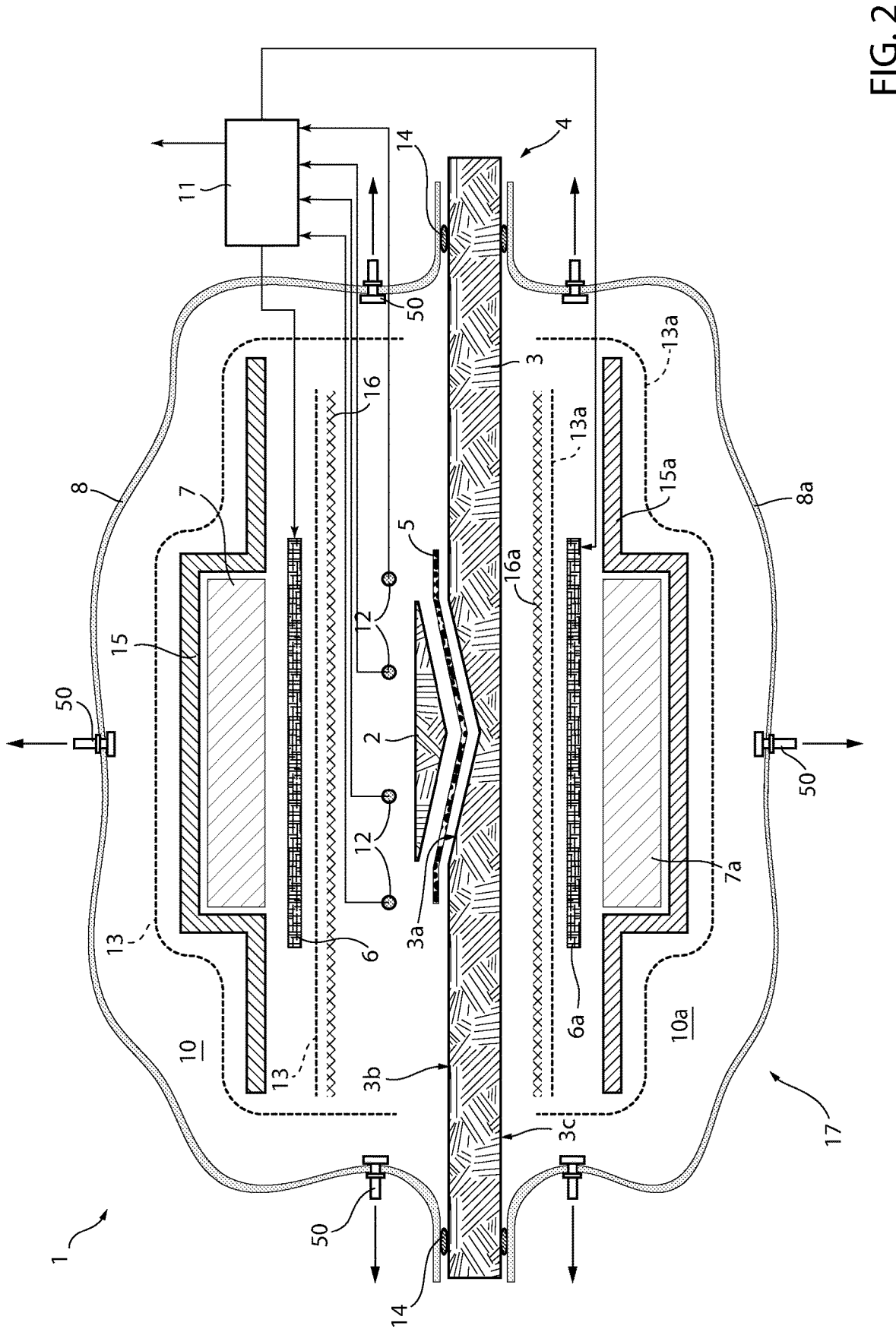
FIG. 2 is a schematic side view, with parts removed for clarity, of the device manufactured in accordance with an alternative embodiment of the present invention, in an exploded configuration.

With reference to FIG. 2, the device manufactured according to an alternative embodiment of the present invention comprises counterpressure means 17 configured to apply a counterpressure on an intact surface 3*c* of the second element 3 opposite the surface 3*b* having the portion 3*a* to be repaired. Such embodiment is particularly convenient in the case the second element 3 to be repaired is a rather thin part, for example a thin panel. Therefore, the counterpressure is configured to counterbalance the aforementioned pressure applied to the surface 3*b* in order to prevent the too high stresses from damaging or deforming the second element 3 in repair.

Conveniently, the counterpressure means 17 consist in applying layers onto the intact surface 3*c* which are symmetrical to those applied onto the surface 3*b*, preferably without the presence of the thermocouples 12. Therefore, the counterpressure means 17 comprise a second electric blanket 6*a*, a second shape memory layer 7*a*, a second vacuum bag 8*a* defining a second vacuum chamber 10*a*. Preferably, the counterpressure means 17 also comprise a second layer of release film 16*a*, a second cover 15*a* and second layers of ventilating fabric 13*a*, arranged symmetrically to the first layers, relative to the patch 2 and to the second element 3.

In one embodiment, the counterpressure means 17 further include a second plurality of thermocouples (not illustrated).

According to what illustrated in FIGS. 1 and 2, the second element 3 to be repaired has a flat conformation.

Figure 3:
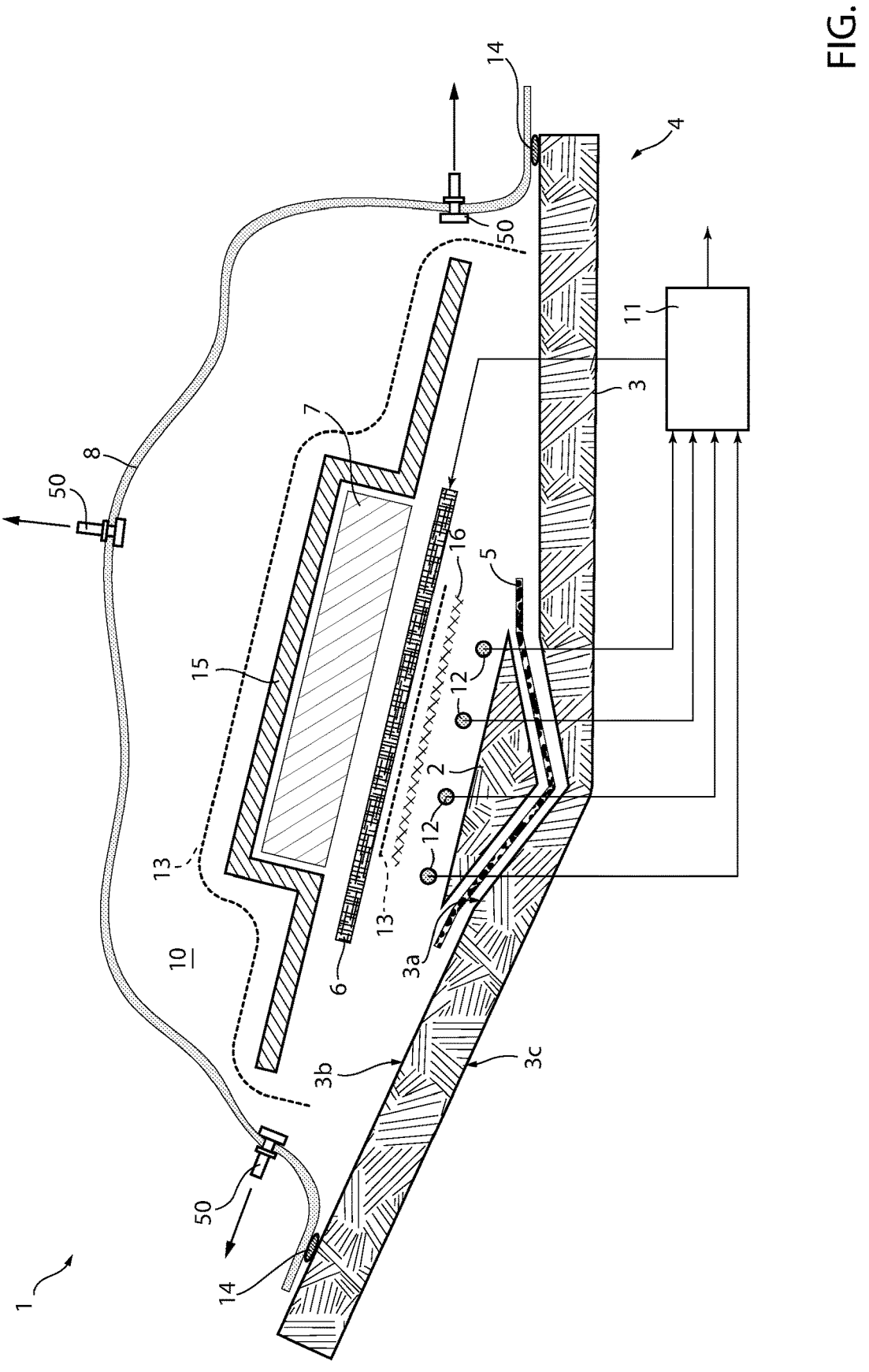
FIG. 3 shows the device of FIG. 1 in an alternative configuration.

However, the device 1 further allows repairing angled parts, as is shown in FIG. 3. In fact, thanks to the fact that the electric blanket 6 and the accessory layers 13 and 16 are non-rigid and thanks to the versatility and adaptability of the device 1 in its wholeness, the device 1 can be easily applied also to angled parts.

With reference to FIGS. 4 and 5, a further preferred embodiment of the present invention is now described.

In accordance with such embodiment, the device 1 comprises a sealed deformable non-rigid hollow element 18, in the following called for simplicity bladder, the inner volume of which is filled with a fluid, for example gas under pressure or liquid.

In particular, the bladder 18 is defined by a sort of closed and sealed pocket, preferably impermeable, completely filled with fluid and deformable for adapting to any shape.

Advantageously, the bladder 18 is available between the shape memory layer 7 and the patch 2 for receiving the pressure exerted by the shape memory layer 7, transforming it in hydrostatic pressure and applying it to the patch 2.

In particular:

FIG. 4 shows the device 1 according to such embodiment in an "exploded" condition, wherein the shape memory layer 7 is in the compressed condition and the bladder 18 is in a non-stressed state;

FIG. 5 shows the device 1 according to such embodiment in an operation condition, wherein the shape memory layer 7 is in the expanded condition (thanks to the heat received from the electric blanket 6) and the bladder 18 is in a stressed state.

In such latter condition, the shape memory layer 7 applies the release load (pressure) to the bladder 18; the fluid contained therein receives such pressure and transforms it into hydrostatic pressure, which is uniformly applied to the patch 2 in all the directions. Being the bladder 18 deformable, it adapts to any conformation of the second element 3, of the portion 3a to be repaired and of the patch 2.

This configuration is particularly advantageous in the case where the structural component 4 to be repaired has a complex shape, for example an omega shape, as in the case of a stringer.

Conveniently, in the case described above the electric blanket 6 is interposed between the patch 2 and the bladder 18, the latter being manufactured in a thermally conductive material. In such manner, it is possible to reach an optimal temperature both at the composite material and at the shape memory material.

Alternatively:

the electric blanket 6 is arranged between the shape memory layer 7 and the bladder 18; or the electric blanket 6 is arranged on the shape memory layer 7 on the opposite side relative to the bladder 18, in particular on the cover 15 when the latter is present. In this latter case, the uniformity of the pressure applied is ensured, since there is no interposition of the electric blanket 6 between patch 2 and bladder 18.

In light of the above, the device 1 according to the invention allows implementing a method of joining a first element 2 in composite material with a second element 3 in composite material for defining a structural component 4 of an aircraft, the method comprising the steps of:

a) arranging the first element 2 in contact on the second element 3;

b) applying the non-rigid electric blanket 6 on the first element 2;

c) applying the shape memory layer 7, pre-loaded in the compressed non-equilibrium condition, onto the electric blanket 6;

d) applying the vacuum bag 8 to the assembly thus obtained;

e) sealing the vacuum bag 8 for defining the vacuum chamber 10;

f) applying vacuum inside the vacuum chamber 10;

g) applying heat to the first element 2, to the second element 3 and to the shape memory layer 7 by activating the electric blanket 6;

h) expanding the shape memory layer 7 from the compressed non-equilibrium condition to the expanded equilibrium condition by means of the step g) of applying heat; and i) applying pressure to the first element 2 for compacting it against the second element 3 by means of the step h) of expanding.

Preferably, the step i) of applying pressure includes:

expanding the shape memory layer 7 against the bladder 18, thereby applying pressure on the fluid contained in the latter;

transforming such pressure into a hydrostatic pressure by means of the fluid contained in the bladder 18;

applying the hydrostatic pressure on the first element 2 by means of the bladder 18 stressed by the expanding shape memory layer 7.

Advantageously, the device 1 according to the invention allows carrying out a repair of the structural component 4. In fact, in the case where the second element 3 defines a structural component of an aircraft having a damaged or defective portion 3a and the first element defines a repair patch 2, the method includes the steps of:

s) arranging the first element at the damaged or defective portion of the second element;

t) repairing the second element by joining with the first element by means of the step g) of applying heat and the step i) of applying pressure.

The present invention is also advantageously but not limitedly applied to the cure of the composite material constituting the structural component 4.

Figure 6:
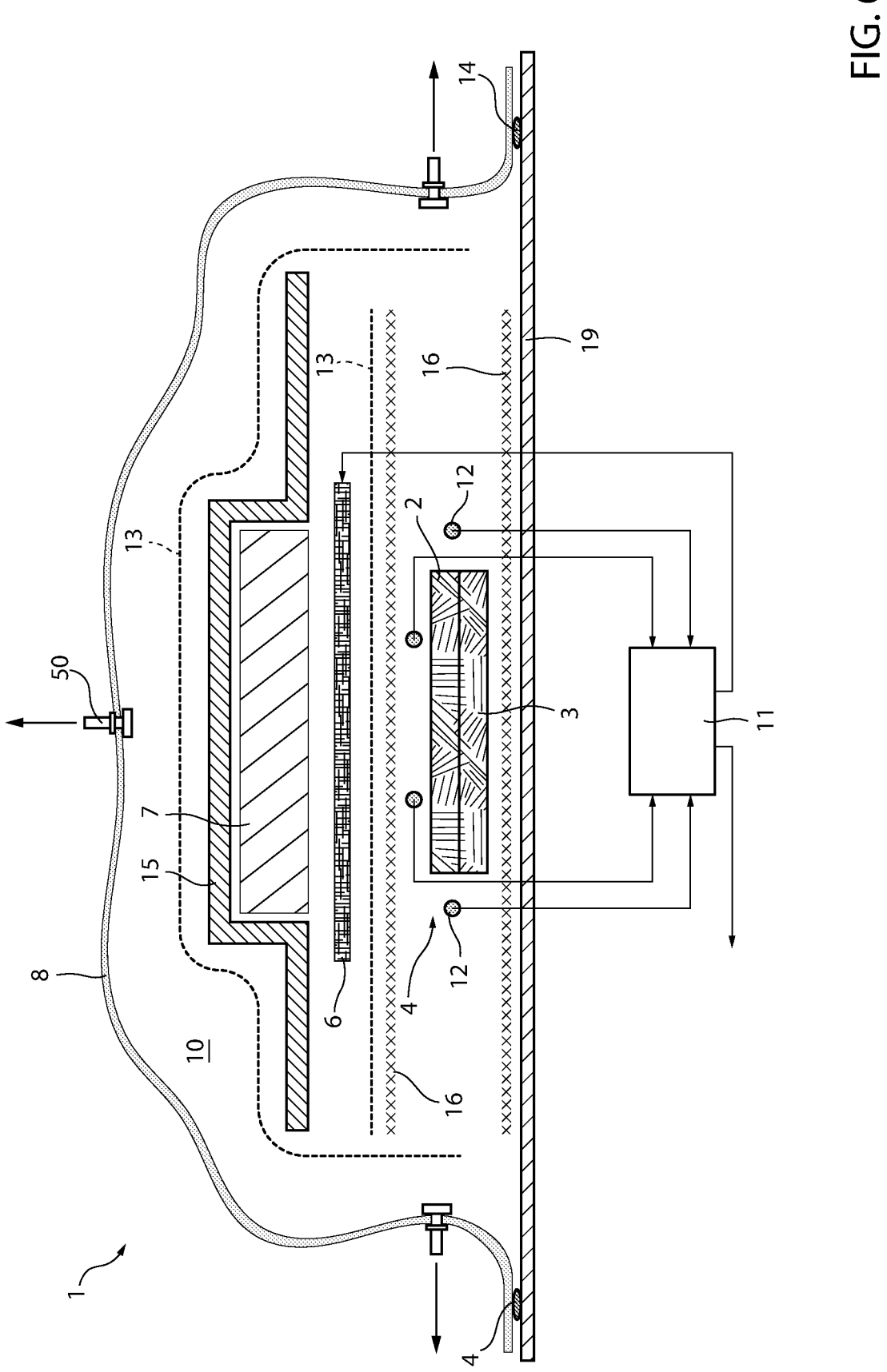
FIG. 6 is a schematic side view, with parts removed for clarity, of the device according to a further embodiment of the present invention, in an exploded configuration.

Therefore, with reference to FIG. 6, a further possible procedure is illustrated implementable by means of the device 1 according to the present invention.

The device 1 according to such embodiment is identical to the device 1 already described, unless what follows.

More in particular, the device 1 according to the present invention further allows carrying out a cure process of the structural component 4.

In fact, in the case where the first element defines at least a first layer 2 of non-cured or pre-cured pre-impregnated composite material, or a plurality of first layers 2, and the second element defines at least a second layer 3 of non-cured or pre-cured pre-impregnated composite material, or a plurality of second layers 3, the method includes the steps of:

v) arranging the first and the second layers, previously laminated together, on a cure tool 19;

z) curing the composite material of the first layer 2 and of the second layer 3 by means of the step g) of applying heat and the step i) of applying pressure.

More precisely, in such case the joining is caused between the first element 2 and the second element 3 and the cure of the composite material (polymerization of the resin) by means of the shape memory layer 7 (due to the pressure) and the electric blanket 6 (due to the temperature).

Preferably, the device 1 comprises in such case a further layer of release film 16 interposed between the second layer 3 and the cure tool 19.

In such manner, it is possible to carry out a cure process of two (or more) elements in composite material without having to recur to the use of an autoclave. This is particularly advantageous in the case of structural components 4 having small dimensions.

Furthermore, thanks to the presence of the thermocouples 12, the precision of the process is improved.

By examining the characteristics of the device 1 manufactured according to the present invention, and of the method of joining which it allows implementing, the advantages that they allow obtaining are evident.

In particular, thanks to the above-described configuration, it is possible to implement a simple, effective, rapid, adaptable and flexible method for joining two elements in composite material, depending on the dimensions and on the conformation of the pieces to be joined.

The device 1 further allows implementing the method as repair method or simply as cure method.

The portability and adaptability of the device 1 allow carrying out the repair or cure also directly on localized parts of the aircraft, without the need of having to demount the component 4 to be repaired/cured and without the need for an autoclave for the cure.

It is clear that modifications and variations can be made to the device 1 and to the method described and illustrated herein without thereby departing from the scope of protection defined by the claims.

The invention claimed is:

1. A method of joining a first element in composite material with a second element in composite material to define a structural component of an aircraft, the method comprising the steps of:
   a) arranging the first element in contact on the second element;
   b) applying a non-rigid heating layer on the first element;
   c) applying a layer of shape memory thermoplastic polymer, pre-loaded in a compressed non-equilibrium condition, onto the heating layer to obtain an assembly;
   d) applying a vacuum bag to the assembly thus obtained;
   e) sealing the vacuum bag to define a vacuum chamber housing the first element, at least part of the second element, the heating layer and the shape memory layer;
   f) applying vacuum inside the vacuum chamber;
   g) applying heat to the first element, to the second element and to the shape memory layer by activating the heating layer;
   h) expanding the shape memory layer from the compressed non-equilibrium condition to an expanded equilibrium condition by means of the step g) of applying heat;
   i) applying pressure to the first element for compacting it against the second element by means of the step h) of expanding.

2. The method as claimed in claim 1, and comprising the steps of:
   l) arranging at least one temperature sensor at the first element and/or the second element;
   m) measuring, by means of the temperature sensor, the temperature reached during the step g) of applying heat;
   wherein the step g) of applying heat comprises controlling the temperature of the heating layer based on the temperature value measured during the step m) of measuring.

3. The method as claimed in claim 1, and comprising the steps of:
   n) arranging a ventilation layer between the heating layer and the first element; and/or
   o) arranging a layer of release film between the heating layer and the first element, in particular between the first element and the ventilation layer when the latter is present.

4. The method as claimed in claim 1, and comprising the step of:
   p) arranging a cover layer in contact onto the shape memory layer;
   wherein the step i) of applying pressure includes limiting and/or preventing, by means of the cover layer, the expansion of the shape memory layer in a direction opposite to the first element.

5. The method as claimed in claim 4, and comprising the step of:
   q) keeping the cover layer in a fixed position by means of the step f) of applying vacuum.

6. The method as claimed in claim 1, and comprising the step of:
   r) arranging a sealed deformable non-rigid hollow element, the inner volume of which is filled with a fluid, between the shape memory layer and the first element;
   wherein the step i) of applying pressure includes:
      expanding the shape memory layer against the non-rigid hollow element, thereby applying pressure on the fluid contained in the latter;
      transforming such pressure into a hydrostatic pressure by means of the fluid contained in the non-rigid hollow element; and
      applying the hydrostatic pressure on the first element by means of the non-rigid hollow element stressed by the expanding shape memory layer.

7. The method as claimed in claim 6, wherein the heating layer is arranged in one of the following configurations:
   arranging the heating layer between the first element and the non-rigid hollow element, the latter being made of a thermally conductive material; or
   arranging the heating layer between the shape memory layer and the non-rigid hollow element; or
   arranging the heating layer on a side of the shape memory layer opposite the non-rigid hollow element.

8. The method as claimed in claim 1, wherein the second element defines a structural component of an aircraft having a damaged or defective portion and the first element defines a repair patch;
   the method including the steps of:
   s) arranging the first element at the damaged or defective portion of the second element;
   t) repairing the second element by joining with the first element by means of the step g) of applying heat and the step i) of applying pressure.

9. The method as claimed in claim 8, and comprising the step of:
   u) applying a counterpressure on an intact surface of the second element opposite a surface of the second element having the damaged or defective portion;
   wherein the step u) of applying a counterpressure includes:
      applying a second non-rigid heating layer onto the intact surface of the second element, with or without the interposition of further layers of release material or ventilating material;
      applying a second layer of shape memory thermoplastic polymer, pre-loaded in a compressed non-equilibrium condition, onto the second heating layer to obtain a second assembly;
      applying a second vacuum bag to the second assembly thus obtained;
      sealing the second vacuum bag to define a second vacuum chamber partially delimited by the intact surface and housing the second heating layer and the second shape memory layer;
      applying vacuum inside the second vacuum chamber;
      applying heat to the first element, to the second element and to the second shape memory layer by activating the second heating layer;
      expanding the second shape memory layer from the compressed non-equilibrium condition to an expanded equilibrium condition activating the second heating layer to apply the heat to the second shape memory layer;

applying pressure to the intact surface of the second element by expanding the second shape memory layer.

10. The method as claimed in claim 1, wherein the first element defines at least a first layer of non-cured or partially cured pre-impregnated composite material and the second element defines at least a second layer of non-cured or partially cured pre-impregnated composite material;

and wherein the method includes the steps of:

v) arranging the first and second layers, previously laminated together, on a cure tool;

z) curing or further curing the composite material of the first layer and of the second layer by means of the step g) of applying heat and the step i) of applying pressure.

11. A device for joining a first element in composite material with a second element in composite material to define a structural component of an aircraft, the device comprising:

a non-rigid heating layer configured to be applied on the first element when the latter is arranged in use in contact onto the second element;

a layer of shape memory thermoplastic polymer controllable between a compressed non-equilibrium condition and an expanded equilibrium condition, and configured to be arranged pre-loaded in the compressed condition onto the heating layer to obtain an assembly and to be expanded by supplying heat by activating the heating layer; and a vacuum bag configured to be applied to the assembly thus obtained to define a vacuum chamber housing the shape memory layer, the heating layer, the first element and at least part of the second element;

wherein the heating layer is configured to apply heat to the first element and to the second element;

and wherein the shape memory layer is configured to apply pressure to the first element for compacting it against the second element by passing from the compressed condition to the expanded condition.

12. The device as claimed in claim 11, and comprising: a control unit; and at least one temperature sensor arrangeable at the first element and/or at the second element and configured to measure a temperature reached therein following the activation of the heating layer and to send a temperature signal to the control unit;

wherein the control unit is configured to control the temperature of the heating layer based on the temperature signal received from the temperature sensor.

13. The device as claimed in claim 11, and comprising a cover layer arranged in contact onto the shape memory layer on the opposite side relative to the first element and configured to limit and/or prevent the expansion of the shape memory layer in a direction opposite to the first element.

14. The device as claimed in claim 11, and comprising a sealed deformable non-rigid hollow element, the inner volume of which is filled with a fluid;

the non-rigid hollow element being arrangeable between the shape memory layer and the first element to receive the pressure exerted by the shape memory layer, transform it into hydrostatic pressure and apply it to the first element.

* * * * *